(12) United States Patent
Ishihara

(10) Patent No.: US 9,398,202 B2
(45) Date of Patent: Jul. 19, 2016

(54) IMAGING DEVICE

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/740,042

(22) Filed: Jun. 15, 2015

(65) Prior Publication Data
US 2015/0373240 A1 Dec. 24, 2015

(30) Foreign Application Priority Data

Jun. 18, 2014 (JP) ................................. 2014-125725

(51) Int. Cl.
*H04N 5/225* (2006.01)
*G02B 6/06* (2006.01)
(52) U.S. Cl.
CPC ................ *H04N 5/2254* (2013.01); *G02B 6/06* (2013.01)
(58) Field of Classification Search
CPC .......... H04N 5/2254; G02B 6/06; G02B 6/02; G02B 6/04; G02B 27/0994; A61B 1/042; G03B 39/06
USPC .......................... 348/359, 335, 340; 359/341.1
See application file for complete search history.

(56) References Cited

U.S. PATENT DOCUMENTS

| 8,488,257 B2 * | 7/2013 | Stark ...................... G02B 13/06 348/36 |
| 2008/0058629 A1 * | 3/2008 | Seibel ...................... A61B 1/04 600/368 |
| 2013/0076900 A1 * | 3/2013 | Mrozek .................. G02B 13/06 348/144 |
| 2013/0258490 A1 * | 10/2013 | Ishihara ............... H04N 5/2254 359/648 |
| 2014/0332666 A1 * | 11/2014 | Mori ..................... H04N 5/2254 250/208.1 |
| 2015/0207990 A1 * | 7/2015 | Ford ..................... H04N 5/2254 348/262 |

FOREIGN PATENT DOCUMENTS

JP 07-87371 A 3/1995

* cited by examiner

*Primary Examiner* — Nhan T Tran
(74) *Attorney, Agent, or Firm* — Canon USA, Inc. IP Division

(57) ABSTRACT

An imaging device includes an imaging optical system, an image sensor, and an optical fiber bundle including optical fibers to guide light from the system to the sensor. The optical fiber bundle includes an optical fibers first and second pair, each pair having two optical fibers that are adjacent in a meridional direction. In the first and second pair of optical fibers, a first value, which is a value representing a ratio of a distance component in the meridional direction between the optical fibers centers along a light-exit surface to a distance component in the meridional direction between optical fibers centers along a light-incident surface, is greater than one. The optical fibers second pair is located farther from an optical system optical axis than the optical fibers first pair. The first value in the optical fibers second pair is greater than the first value in the optical fibers first pair.

22 Claims, 9 Drawing Sheets

IMAGING DEVICE

BACKGROUND OF THE INVENTION

1. Field of the Invention

The present invention relates to imaging devices.

2. Description of the Related Art

Imaging devices that include fiber bundles (optical waveguides) constituted by a plurality of optical fibers (optical waveguide members) are being developed.

Japanese Patent Laid-Open No. 7-087371 discloses an imaging device that includes, as optical waveguide members constituting an optical waveguide, optical waveguide members each having end surfaces of different sizes. In this imaging device, a smaller end surface of the optical waveguide serves as a light-incident surface, and an imaging unit is provided at the other larger end surface, serving as a light-exit surface, of the optical waveguide. In addition, the ratio between the sizes of the two end surfaces of each of the optical waveguide members is constant among the optical waveguide members.

According to Japanese Patent Laid-Open No. 7-087371, the ratio between the two end surfaces is constant, and thus it is not easy to reduce distortion of an image occurring when an image at the light-incident surface is transferred to the light-exit surface.

SUMMARY OF THE INVENTION

According to an aspect of the present invention, an imaging device includes an imaging optical system, an image sensor, and an optical fiber bundle including a plurality of optical fibers configured to guide light from the imaging optical system to the image sensor. The optical fiber bundle includes a first pair of optical fibers including two optical fibers that are adjacent in a meridional direction and a second pair of optical fibers including two optical fibers that are adjacent in the meridional direction. In each of the first pair of optical fibers and the second pair of optical fibers, a first value, which is a value representing a ratio of a component of a distance in the meridional direction between centers of the optical fibers along a light-exit surface to a component of a distance in the meridional direction between centers of the optical fibers along a light-incident surface, is greater than 1. The first value in the second pair of optical fibers, which is located farther from an optical axis of the imaging optical system, is greater than the first value in the first pair of optical fibers, which is located closer to the optical axis of the imaging optical system.

Further features of the present invention will become apparent from the following description of exemplary embodiments with reference to the attached drawings.

DESCRIPTION OF THE EMBODIMENTS

Figure 1A:
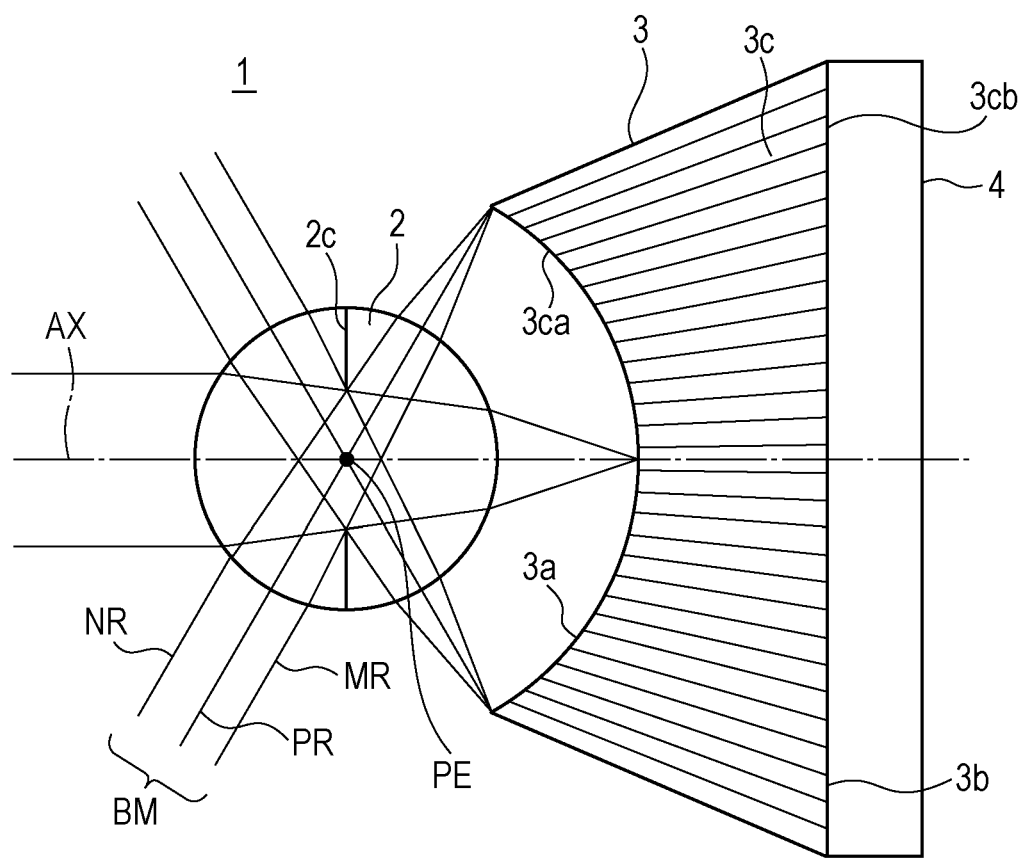
FIG. 1A is a schematic diagram illustrating an example of an imaging device according to the present invention.

FIG. 1A is a schematic diagram illustrating an example of an imaging device according to the present invention. An imaging device 1 illustrated in FIG. 1A includes a ball lens 2 serving as an imaging optical system, an optical fiber bundle 3 serving as an image transfer unit, and a sensor 4 serving as an image sensor. The ball lens 2, the optical fiber bundle 3, and the sensor 4 are disposed such that an image on the ball lens 2 is transferred to the sensor 4 through the optical fiber bundle 3.

The optical fiber bundle 3 includes a plurality of optical fibers 3c, which guide light from the ball lens 2 to the sensor 4. Specifically, each of the optical fibers 3c receives imaging light BM through the ball lens 2, allows the imaging light BM to propagate through the optical fiber 3c, and guides the imaging light BM to pixels in the sensor 4. The imaging light BM can pass through an opening in a stop 2c and enter the optical fibers 3c, and includes a principal ray PR that passes through the center of the opening in the stop 2c and upper and lower marginal rays NR and MR that are defined by the opening in the stop 2c. Although an optical fiber bundle is used as the image transfer unit in the following description, the image transfer unit is not limited thereto, and an optical waveguide that includes a plurality of optical waveguide members may also be used as the image transfer unit. Specific examples of the optical waveguide members include a ridge-type optical waveguide and a photonic crystal.

A light-incident surface 3a of the optical fiber bundle 3 is recessed away from the ball lens 2, or more specifically, has a concave shape that is substantially identical to the shape of the imaging surface of the ball lens 2. This concave shape is designed so as to follow the shape of the field curvature of the imaging optical system and makes it possible to correct the field curvature of the imaging optical system. In addition, this concave shape has an advantage in that distortion can be corrected while the resolution (horizontal resolution) of an image is kept being high, which will be described later.

The light-incident surface 3a of the optical fiber bundle 3 is formed into a smooth optical surface, as in a glass lens, through a spherical polishing process. This processing technique can prevent light from being scattered by the surface of the light-incident surface 3a. Meanwhile, a light-exit surface 3b of the optical fiber bundle 3 is planar. The optical fiber bundle 3 is disposed such that the light-exit surface 3b is in tight contact with a light-incident surface of the sensor 4. The light-exit surface 3b of the optical fiber bundle 3 is also formed into an optical surface through a planar polishing process, as in the light-incident surface 3a, which improves the adhesiveness of the light-exit surface 3b to the image sensor.

In addition, optical fibers 3c that are located in a peripheral portion of the optical fiber bundle 3 are inclined relative to an optical axis AX. The angles of inclination of these optical fibers 3c are set so as to satisfy a condition in which the imaging light BM entering these optical fibers 3c undergoes total reflection inside the optical fibers 3c. Through this configuration, the transmittance of the optical fibers 3c located in the peripheral portion of the optical fiber bundle 3 can be prevented from decreasing.

It is to be noted that the optical axis AX of the ball lens 2 corresponds to a straight line that passes through the center of an opening defined by the stop 2c provided in the ball lens 2 and that is perpendicular to a light-receiving surface of the sensor 4. The center of the opening in the stop 2c coincides with the center of an exit pupil of the ball lens 2, and the optical axis AX can also be said to be a straight line that passes through the center PE of the exit pupil of the imaging optical system and that is perpendicular to the light-receiving surface of the sensor 4. In addition, the optical axis AX passes through the center of the light-incident surface 3a of the optical fiber bundle 3. In other words, the optical axis AX coincides with a straight line connecting the center of the exit pupil of the imaging optical system and the center of the light-incident surface 3a of the optical fiber bundle 3.

Figure 1B:
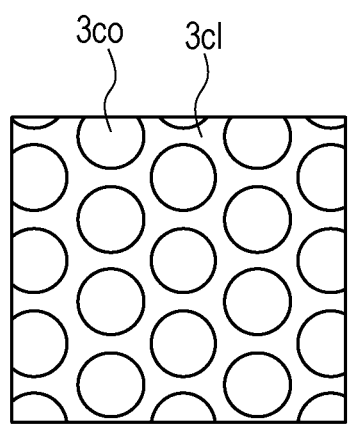
FIG. 1B is a schematic diagram illustrating a fragmentary section of an optical fiber bundle taken along a plane parallel to a light-receiving surface of a sensor.

FIG. 1B is a fragmentary section of the optical fiber bundle 3, taken along a plane parallel to the light-receiving surface of the sensor 4. Along this section, core portions 3co are disposed in a triangular lattice pattern, and clad portions 3cl are disposed between the core portions 3co. In this manner, the optical fibers 3c are constituted by the core portions 3co and the clad portions 3cl disposed so as to enclose the respective core portions 3co. Although the core portions 3co are disposed in the triangular lattice pattern in FIG. 1B, the pattern is not limited thereto. For example, the core portions 3co may be disposed in any desired lattice pattern, such as a square lattice pattern and a rhombic lattice pattern. In addition, as long as the clad portions 3cl are disposed between the core portions 3co, the core portions 3co may be disposed at random. Furthermore, an optical fiber bundle that includes a region in which the core portions 3co are disposed in a lattice pattern and another region in which the core portions 3co are disposed at random can also be used.

The optical fibers 3c in the optical fiber bundle 3 may or may not be in a one-to-one correspondence with the pixels in the sensor 4. For example, part of the imaging light BM that has propagated through a given optical fiber 3c may be received by one of the pixels in the sensor 4 and the remaining part of the imaging light BM may be received by another pixel. Alternatively, one of the pixels in the sensor 4 may receive the imaging light BM that has propagated through a plurality of optical fibers 3c.

The pitch of adjacent optical fibers 3c, among the optical fibers 3c, on the light-exit surface 3b of the optical fiber bundle 3 may be set to the pitch that is substantially identical to the pixel pitch of the sensor 4 (i.e., the difference falls within ±20% of the pitch), and then an image transferred to the light-exit surface 3b of the optical fiber bundle 3 can be obtained by the sensor 4 with its high resolution being unchanged.

Figure 2:
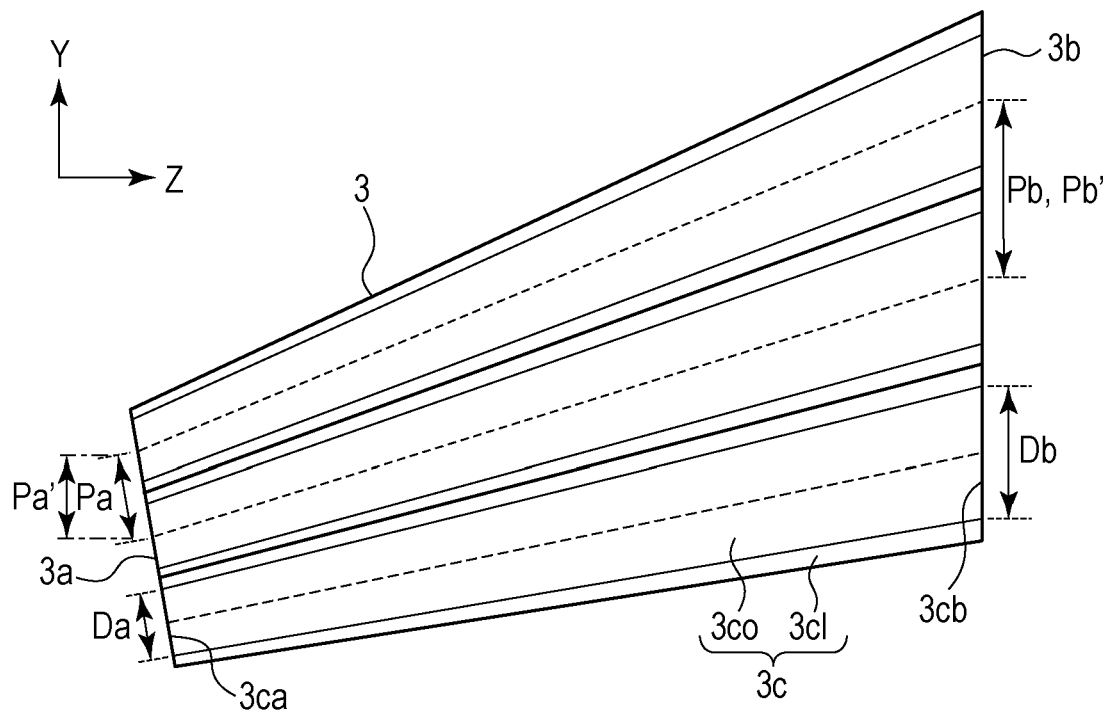
FIG. 2 is a schematic diagram for describing the distance between the centers of optical fibers and the cross-sectional area of a core portion.

Now, terms used in the present specification will be defined. FIG. 2 is a schematic diagram illustrating three optical fibers arrayed in the meridional direction of the optical fiber bundle 3. The meridional direction is a radial direction from the optical axis AX serving as the center and is indicated as a Y-direction in FIG. 2. A Z-direction is parallel to the optical axis AX. As illustrated in FIG. 2, with respect to two optical fibers that are adjacent in the Y-direction, Pa is the distance between the centers of the two adjacent optical fibers along the light-incident surface 3a of the optical fiber bundle 3, and Pa' is a component of the distance Pa in the meridional direction. In addition, Pb is the distance between the centers of the two adjacent optical fibers along the light-exit surface 3b of the optical fiber bundle 3, and Pb' is a component of the distance Pb in the meridional direction. In FIG. 2, the light-exit surface 3b is parallel to the Y-direction, and thus Pb is equal to Pb'.

With respect to the two optical fibers that are adjacent in the Y-direction, a value Rp corresponds to a value Pb/Pa, which is the ratio of the distance Pb between the centers of the two adjacent optical fibers along the light-exit surface 3b of the optical fiber 3 to the distance Pa between the centers of the two adjacent optical fibers along the light-incident surface 3a. In a similar manner, Rp' corresponds to a value Pb'/Pa' or the ratio therebetween. In the present invention, with respect to any two optical fibers that are adjacent in the Y-direction, the value Rp and the value Rp' are both greater than 1.

It is to be noted that not all of the optical fibers in the optical fiber bundle 3 need to be configured as described above, and there may be a portion in which two optical fibers are not adjacent in the meridional direction.

In addition, Da represents the diameter of the core portion 3*co* along a light-incident surface 3*ca* of the optical fiber 3*c*, and Db represents the diameter of the core portion 3*co* along a light-exit surface 3*cb* of the optical fiber 3*c*. Then, a value Rt corresponds to a value Db/Da, which is the ratio of the diameter Db of the core portion 3*co* along the light-exit surface 3*cb* of the optical fiber 3*c* to the diameter Da of the core portion 3*co* along the light-incident surface 3*ca* of the optical fiber 3*c*. It is preferable that the value Rt be greater than 1.

Figure 3A:
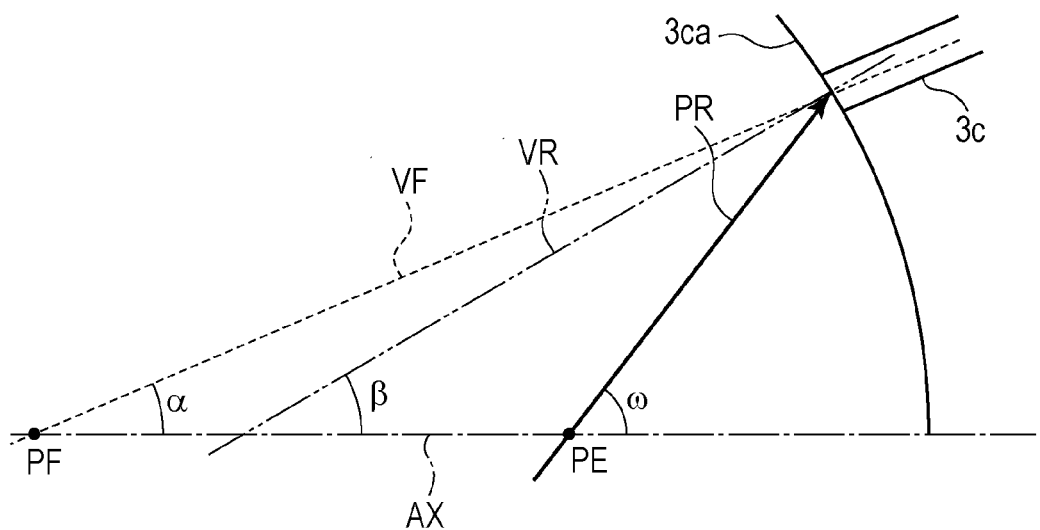
FIG. 3A is a schematic diagram for describing the angle of inclination of an optical fiber.
Figure 3B:
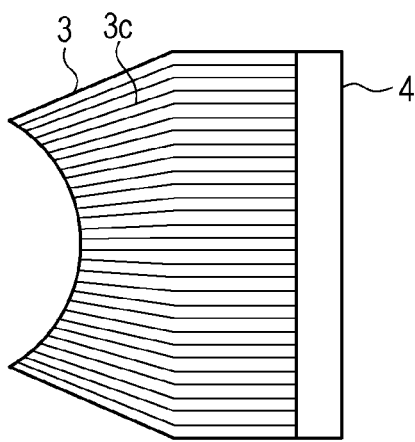
FIG. 3B is a schematic diagram illustrating an example of an optical fiber bundle according to a first exemplary embodiment.
Figure 3C:
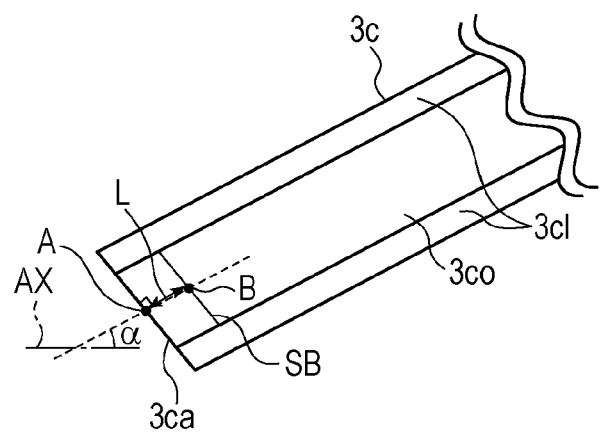
FIG. 3C is an illustration for describing the axis of an optical fiber.

With reference to FIGS. 3A, 3B, and 3C, the angle α of inclination of an optical fiber 3*c* relative to the optical axis AX of the ball lens 2 will be described. In FIG. 3A, the angle α of inclination is an angle that is formed by an axis VF of the optical fiber 3*c* and the optical axis AX and that is no less than 0.0 and less than 90.0 (deg). In the present exemplary embodiment, however, the size of the core portion 3*co* of the optical fiber 3*c* differs depending on the position along the core portion 3*co*. In addition, the shape of the optical fiber 3*c* may be linear or curved. Furthermore, in the present exemplary embodiment, as illustrated in FIG. 3B, the optical fibers 3*c* constituting the optical fiber bundle 3 may each include a portion in which the optical fiber 3*c* extends parallel to the optical axis AX and a portion in which the optical fiber 3*c* does not extend parallel to the optical axis AX. Therefore, with reference to FIG. 3C, the axis VF of the optical fiber 3*c* is defined as follows. The axis VF is a straight line that connects a center point A of a section of the core portion 3*co* along the light-incident surface 3*ca* of the optical fiber 3*c* and a center point B of a section SB of the core portion 3*co*. The center point B is located toward the inner side of the core portion 3*co* from the center point A by the size L of the diameter of the core portion 3*co* along the light-incident surface 3*ca* of the optical fiber 3*c*.

In FIG. 3A, β represents the angle of inclination of the light-incident surface 3*ca* of the optical fiber 3*c*. Specifically, the angle β of inclination is an angle that is formed by an the normal VR of the light-incident surface 3*ca* of the optical fiber 3*c* and the optical axis AX and that is no less than 0.0 and less than 90.0 (deg). In the present invention, the optical fiber 3*c* is configured such that the angle β of inclination is greater than the angle α of inclination. In other words, α<β holds true. It is to be noted that the light-incident surface 3*ca* of the optical fiber 3*c* is a very small region relative to the light-incident surface 3*a* of the optical fiber bundle 3 and is thus regarded as being planar.

In FIG. 3A, ω represents the angle of the principal ray PR that enters the optical fiber 3*c* from the imaging optical system. Specifically, the angle ω is an angle that is formed by the optical axis AX and a straight line connecting the center point PE of the exit pupil of the ball lens 2 and the center point A (refer to FIG. 3C) of the core portion 3*co* along the light-incident surface 3*ca* of the optical fiber 3*c* and that is no less than 0.0 and less than 90.0 (deg). In the present invention, the principal ray PR enters the optical fiber 3*c* at the angle ω that is greater than the angle α of inclination. In other words, α<ω holds true. In this case, distortion that occurs when an image on the light-incident surface 3*a* of the optical fiber bundle 3 is transferred to the light-exit surface 3*b* increases.

The optical fiber bundle 3 is configured such that the value Rp' described above changes in accordance with the distance from the optical axis AX. Specifically, the value Rp' of two optical fibers that are adjacent in the Y-direction and that are closer to the optical axis AX differs from the value Rp' of two optical fibers that are adjacent in the Y-direction and that are farther from the optical axis AX. Now, a value Rp'1 represents the value Rp of the two optical fibers that are adjacent in the Y-direction and that are closer to the optical axis AX. In addition, a value Rp'2 represents the value Rp of the two optical fibers that are adjacent in the Y-direction and that are farther from the optical axis AX. In this case, the value Rp'2 is greater than the value Rp'1. In addition, the value Rp'1 and the value Rp'2 are both greater than 1. Through this configuration, an image becomes enlarged on the light-exit surface 3*b* of the optical fiber bundle 3 as the distance from the optical axis AX increases. Through such enlargement, negative distortion that occurs when an image on the light-incident surface 3*a* of the optical fiber bundle 3 is converted to an image on the light-exit surface 3*b* can be reduced.

The value Rp' contains the following elements:
(1) a component of the distance Pa, in the Y-direction, between the centers of two optical fibers that are adjacent in the Y-direction along the light-incident surface 3*a*;
(2) a component of the distance Pb, in the Y-direction, between the centers of two optical fibers that are adjacent in the Y-direction along the light-exit surface 3*b*; and
(3) the value Rp.

In addition, the element (1) contains the following elements:
(1-1) the distance Pa between the centers of the two optical fibers that are adjacent in the Y-direction along the light-incident surface 3*a*; and
(1-2) the angles of inclination of the light-incident surfaces 3*ca* of the two optical fibers that are adjacent in the Y-direction.

However, the light-incident surface 3*ca* of an optical fiber 3*c* is very small, and thus the angles of inclination indicated in (1-2) can be regarded as the angle β of inclination of either one of the two optical fibers.

In addition, the element (2) contains the following elements:
(2-1) the distance Pb between the centers of the two optical fibers that are adjacent in the Y-direction along the light-exit surface 3*b*; and
(2-2) the angles of inclination of the light-exit surfaces 3*cb* of the two optical fibers that are adjacent in the Y-direction.

Furthermore, the element (3) contains the element (1-1) and the element (2-1).

In other words, the value Rp' can be changed by changing one, some, or all of the element (1), the element (2), the element (3), the element (1-1), the element (1-2), the element (2-1), and the element (2-2) in accordance with the distance from the optical axis AX.

Through such a configuration, an imaging device that reduces distortion generated in the imaging optical system can be obtained. In addition, distortion can be corrected while the resolution (horizontal resolution) of an image obtained by the sensor 4 is kept relatively high.

Hereinafter, exemplary embodiments of the present invention will be described in detail with reference to the drawings, but the present invention is not limited to the configurations of the exemplary embodiments.

First Exemplary Embodiment

Figure 4:
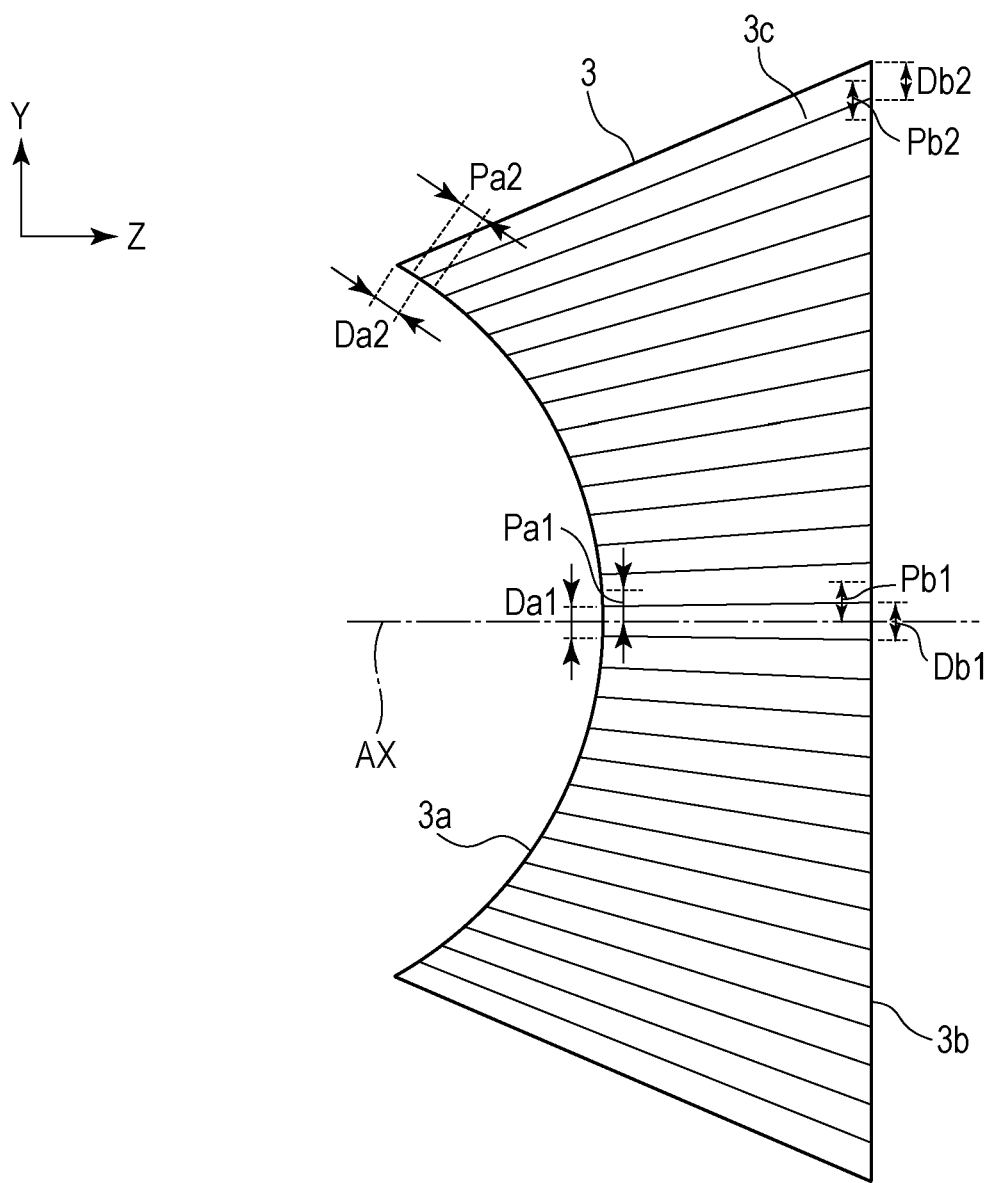
FIG. 4 is a schematic diagram illustrating an example of an optical fiber bundle in an imaging device according to the first exemplary embodiment.

An example of an imaging device according to the present exemplary embodiment is illustrated in FIG. 1. In the present exemplary embodiment, the elements (1) and (3) described above are changed in accordance with the distance from the optical axis AX. FIG. 4 illustrates an example of the optical fiber bundle 3 to be used in the present exemplary embodiment.

As illustrated in FIG. 4, Pa1 represents the distance, along the light-incident surface 3*a*, between the centers of two optical fibers that are adjacent in the Y-direction and that are located closer to the optical axis AX of the ball lens 2. In a similar manner, Pb1 represents the distance, along the light-exit surface 3b, between the centers of the stated pair of optical fibers. In this case, a value Rpt corresponds to a value Pb1/Pa1, which is the ratio of the distance Pb1 between the centers, along the light-exit surface 3b, of the two adjacent optical fibers that are closer to the optical axis AX of the ball lens 2 to the distance Pa1, along the light-incident surface 3a, between the centers of the stated optical fibers.

In a similar manner, Pa2 represents the distance, along the light-incident surface 3a, between the centers of two optical fibers that are adjacent in the Y-direction and that are located farther from the optical axis AX of the ball lens 2. In addition, Pb2 represents the distance, along the light-exit surface 3b, between the centers of the stated pair of optical fibers. In this case, a value Rp2 corresponds to a value Pb2/Pa2, which is the ratio of the distance Pb2, along the light-exit surface 3b, between the centers of the two adjacent optical fibers that are farther from the optical axis AX of the ball lens 2 to the distance Pa2, along the light-incident surface 3a, between the centers of the stated optical fibers.

In FIG. 4, as the two adjacent optical fibers that are located closer to the optical axis AX of the ball lens 2, two adjacent optical fibers located at a center portion of the optical fiber bundle 3 are illustrated. In addition, as the two adjacent optical fibers that are located farther from the optical axis AX of the ball lens 2, two adjacent optical fibers located in an outermost portion of the optical fiber bundle 3 are illustrated. The exemplary embodiment, however, is not limited thereto. It suffices that, with respect to the two pairs of optical fibers being concerned, Pa1 represents the distance between the centers of a pair of optical fibers that are located closer to the optical axis AX of the ball lens 2, and Pa2 represents the distance between the centers of the other pair of optical fibers that are located farther from the optical axis AX of the ball lens 2.

In the present exemplary embodiment, the value Rp1 differs from the value Rp2. Specifically, the value Rp2 is greater than the value Rp1 (Rp1<Rp2). In other words, the element (3) is changed in accordance with the distance. In addition, specifically, the distance Pb1 is equal to the distance Pb2, and the distance Pa1 is greater than the distance Pa2. In other words, the element (1-1) is changed in accordance with the distance. To be more specific, the distance Pa increases as the distance from the optical axis AX increases.

Subsequently, distortion will be considered. When an imaging surface is curved as in a point-symmetric imaging optical system such as the ball lens 2, distortion on the imaging surface is $Y=Rimg \cdot \omega$ property, where Rimg represents the radius of curvature of the light-incident surface 3a of the optical fiber bundle 3. Meanwhile, when an image is formed on a planar surface by a typical imaging optical system that is not point-symmetric, distortion is ideally $Y=f \cdot \tan \omega$, where f represents the focal length. Therefore, when an image on the curved surface of the light-incident surface 3a of the optical fiber bundle 3 is transferred to the planar surface of the light-exit surface 3b, it is desirable that the $Rimg \cdot \omega$ property be corrected to the $f \cdot \tan \omega$ property. Accordingly, in the present invention, it is assumed that distortion does not occur if the imaging surface has the $Y=f \cdot \tan \omega$ property as in a planer surface.

Figure 5A:
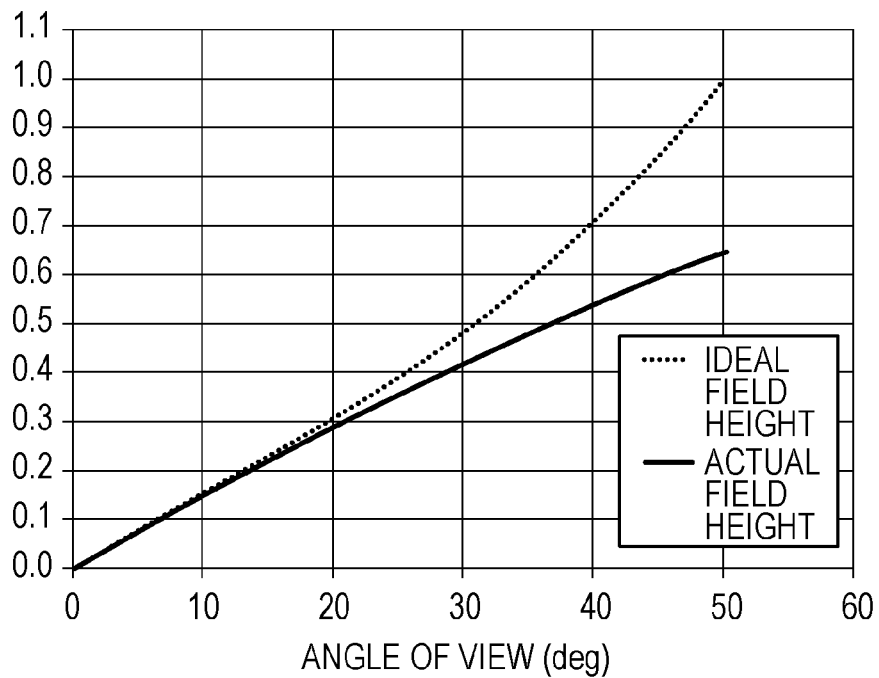
FIG. 5A illustrates the field height ratio according to a comparative example.

First, distortion will be considered in a comparative example in which the value Rp (the value Rp') stays constant throughout the optical fiber bundle 3. FIG. 5A illustrates the field height ratio according to the comparative example. An actual field height and an ideal field height are expressed by field height ratios that have been normalized by the maximum field height of the ideal field height. The ideal field height is expressed in the $Y=f \cdot \tan \omega$ property, in which the maximum angle of view of the imaging optical system is set to $\omega=50.0$ (deg). Meanwhile, the actual field height represents the height of an actual image to be formed on a sensor through a ball lens and an optical fiber bundle of the comparative example.

Figure 5B:
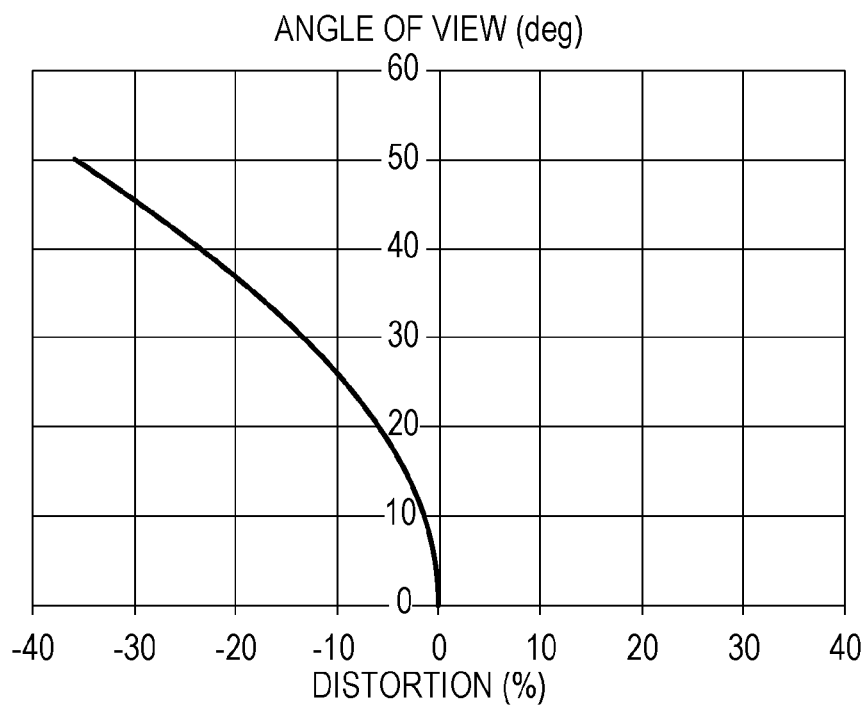
FIG. 5B illustrates distortion according to the comparative example.

FIG. 5B illustrates distortion according to the comparative example, or in other words, the ratio of the amount of shift of the actual field height relative to the ideal field height. In other words, FIG. 5B illustrates the ratio of the amount of shift of the actual field height from the $Y=f \cdot \tan \omega$ property. In the comparative example, large distortion of −35.7(%) occurs at the maximum angle of view of 50.0 (deg).

In the optical fiber bundle of the comparative example, the value Rp and the value Rt stay constant throughout the light-incident surface and are both greater than 1. Therefore, regardless of the position on the light-incident surface of the optical fiber bundle, pixel spacing is increased at a constant magnification. In such a case, it is not possible to correct distortion that has occurred in the imaging optical system by the optical fiber bundle.

In the meantime, in the optical fiber bundle 3 of the imaging device according to the present exemplary embodiment, the value Rp (the value Rp') is set to differ in accordance with the position in the optical fiber bundle 3. Specifically, the value Rp is changed in accordance with the distance from the optical axis AX.

Figure 6A:
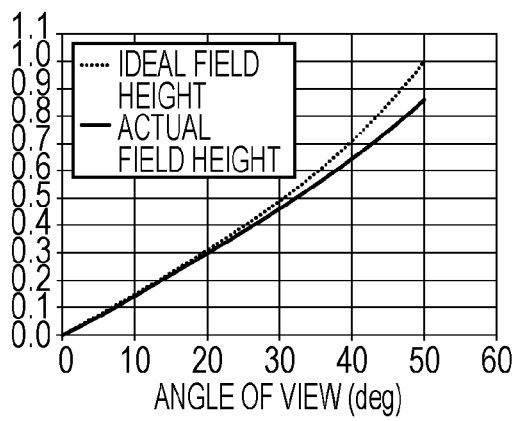
FIG. 6A illustrates the field height ratio in the imaging device according to the first exemplary embodiment.

FIG. 6A illustrates the ideal field height in the imaging device 1 according to the present exemplary embodiment. The actual field height and the ideal field height are normalized by the maximum field height of the ideal field height. The ideal field height is expressed in the $Y=f \cdot \tan \omega$ property, in which the maximum angle of view of the imaging optical system is set to $\omega=50.0$ (deg). Meanwhile, the actual field height represents the height of an actual image to be formed on the sensor 4 through the ball lens 2 and the optical fiber bundle 3 according to the present exemplary embodiment. FIG. 6A reveals that the actual field height is closer to the ideal field height than in the result of the comparative example illustrated in FIG. 5A.

Figure 6B:
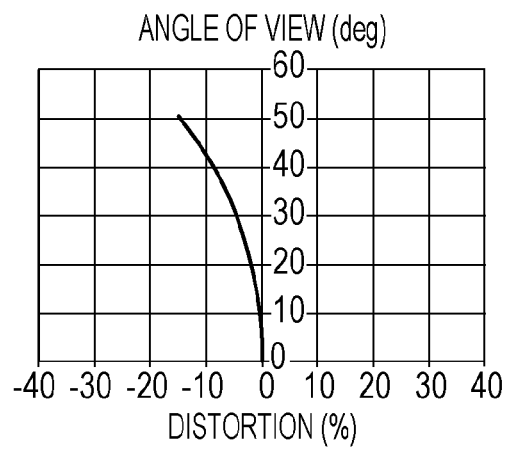
FIG. 6B illustrates distortion in the imaging device according to the first exemplary embodiment.

FIG. 6B illustrates distortion in the imaging device 1 according to the present exemplary embodiment. At the maximum angle of view of $\omega=50.0$ (deg), distortion is −14.7(%), which is less than that in the result of the comparative example illustrated in FIG. 5B.

Figure 6C:
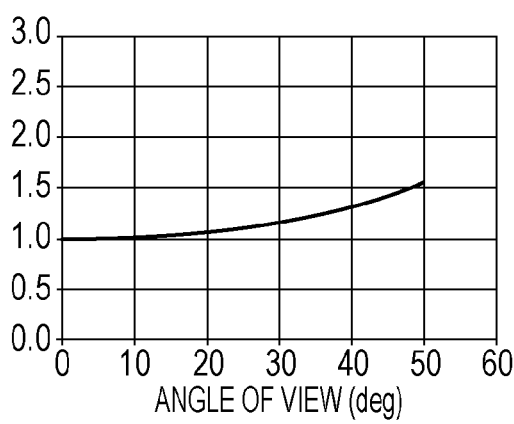
FIG. 6C illustrates a value Rp in the imaging device according to the first exemplary embodiment.

FIG. 6C illustrates the value Rp in the imaging device 1 according to the present exemplary embodiment. Here, the value Rp is indicated such that the value Rp in a pair of optical fibers that is located in a center portion of the optical fiber bundle 3 and that includes an optical fiber extending along the optical axis and another optical fiber adjacent to the stated optical fiber in the Y-direction is 1. In a case in which there is no optical fiber located on the optical axis, the value Rp in a pair of optical fibers that includes an optical fiber located closest to the optical axis and another optical fiber adjacent to the stated optical fiber in the Y-direction is set to 1.

The angle of view on the horizontal axis is mapped to the distance from the optical axis AX, and as the angle of view increases, the distance from the optical axis AX increases. In other words, the configuration of the present exemplary embodiment is as follows. The value Rp representing the ratio in two optical fibers that are adjacent in the Y-direction and that are located farther from the optical axis AX is greater than the value Rp representing the ratio in two optical fibers that are adjacent in the Y-direction and that are located closer to the optical axis AX. Specifically, the value Rp in a pair of optical fibers that includes an optical fiber located farthest from the optical axis AX is greater than the value Rp in a pair of optical fibers that includes an optical fiber located on the optical axis AX or an optical fiber located closest to the optical axis AX. In addition, the value Rp increases as the distance from the optical axis AX of the ball lens 2 increases. It is to be noted that the value Rp is greater than 1 throughout the optical fiber bundle 3.

Figure 6D:
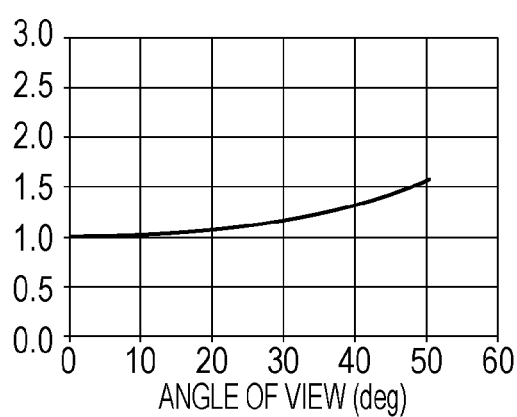
FIG. 6D illustrates a value Rt in the imaging device according to the first exemplary embodiment.

Meanwhile, FIG. 6D illustrates the value Rt in the imaging device 1 according to the present exemplary embodiment. Here, the value Rt is indicated such that the value Rt representing the ratio in the optical axis 3c located on the optical axis AX is 1. The angle of view on the horizontal axis is mapped to the distance from the optical axis AX, and as the angle of view increases, the distance from the optical axis AX increases. In other words, the configuration of the present exemplary embodiment is as follows. The value Rt in an optical fiber located farther from the optical axis AX of the ball lens 2 is greater than the value Rt in an optical fiber located closer to the optical axis AX of the ball lens 2. Specifically, the value Rt in an optical fiber located farthest from the optical axis AX is greater than the value Rt in an optical fiber located on the optical axis AX or an optical fiber located closest to the optical axis AX. In addition, the value Rt increases as the distance from the optical axis AX of the ball lens 2 increases. As this value Rt and the value Rp are changed simultaneously, the space among the optical fibers 3c along the light-exit surface 3b of the optical fiber bundle 3 can be reduced, and thus advantages such as reduction of unevenness in light amount and improvement in fabrication facility can be obtained.

With the use of such an optical fiber bundle 3, an image becomes enlarged on the light-exit surface 3b of the optical fiber bundle 3 as the distance from the center of the image increases. Through such enlargement, negative distortion that occurs when an image on the light-incident surface 3a of the optical fiber bundle 3 is converted to an image on the light-exit surface 3b can be reduced.

The ball lens 2 serving as the imaging optical system has a sufficiently high resolution with respect to the imaging surface. Typically, the spot size (full width at half maximum) Wsp of an imaging optical system is expressed through Expression (1), in which F represents the F-number of the imaging optical system and λ represents the wavelength of light to be used.

$$Wsp = F \times \lambda \quad (1)$$

In the imaging optical system according to the present exemplary embodiment, the F-number F is 1.4, and the wavelength λ being used is from 400 nm to 700 nm. Through Expression (1), the spot size Wsp at the wavelength λ=400 nm being used is 0.56 μm, and the spot size Wsp at the wavelength λ=700 nm being used is 0.98 μm. Thus, a high-resolution image is formed on the imaging surface. Meanwhile, on the light-incident surface of the optical fiber bundle 3, the distance Pa1 between the centers of the two adjacent optical fibers that are located closer to the optical axis AX is 4.0 μm, and the distance Pa2 between the centers of the two adjacent optical fibers that are located farther from the optical axis AX is 2.6 μm.

In this manner, the spot size of the imaging optical system is smaller than the distance between the centers of two adjacent optical fibers along the light-incident surface of the optical fiber bundle 3, and an image formed on the imaging surface by the imaging optical system has a sufficiently high resolution with respect to the optical fiber bundle 3.

As described above, in the present exemplary embodiment, on the light-incident surface 3a of the optical fiber bundle 3, the distance Pa1 between the centers of the two adjacent optical fibers that are located closer to the optical axis AX is greater than the distance Pa2 between the centers of the two adjacent optical fibers that are located farther from the optical axis AX. This configuration enables detailed sampling in the peripheral portion, and thus an image that has passed through the optical fiber bundle 3 and enlarged thereby can has a sufficient spatial resolution. It is preferable that the configuration be such that the distance Pa between the two adjacent optical fibers along the light-incident surface 3a decreases as the distance from the optical axis AX of the ball lens 2 increases. In this case, by setting the distance Pb between the centers of two adjacent optical fibers along the light-exit surface 3b to be constant regardless of the distance from the optical axis AX, the spatial resolution at each field height on the light-exit surface 3b can be kept constant, and a high-quality image can thus be provided.

Typically, when distortion of an image obtained by the sensor 4 is to be corrected through image processing, part of the image is enlarged or reduced so as to keep the partial magnification at each field height constant, and the distortion is thus corrected. At this point, a problem arises in that the resolution (horizontal resolution) deteriorates in part of the image that has been enlarged through the image processing. However, when an image on the imaging optical system having a sufficiently high resolution on the imaging surface is transferred to the sensor 4 through the optical fiber bundle 3 as in the present exemplary embodiment, the image obtained by the sensor 4 has a high resolution (horizontal resolution) even at the peripheral portion thereof, and distortion can also be corrected. In other words, a decrease in the resolution of the image to be caused when the distortion is corrected can be suppressed.

In addition, the pitch Pb of adjacent optical fibers, among the optical fibers 3c, on the light-exit surface 3b of the optical fiber bundle 3 is set to 6.0 μm, and the pixel pitch of the sensor is set to 5.5 μm. In this manner, as the pitch of the adjacent optical fibers, among the optical fibers 3c, on the light-exit surface 3b of the optical fiber bundle 3 is set to be substantially the same as the pixel pitch of the sensor, an image transferred to the light-exit surface 3b of the optical fiber bundle 3 is obtained by the sensor with its high resolution being unchanged.

Figure 6E:
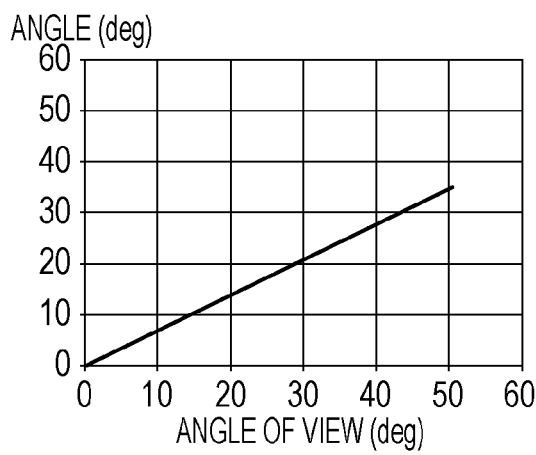
FIG. 6E illustrates the magnitude of the angle $\alpha$ of inclination of an optical fiber in the imaging device according to the first exemplary embodiment.
Figure 6F:
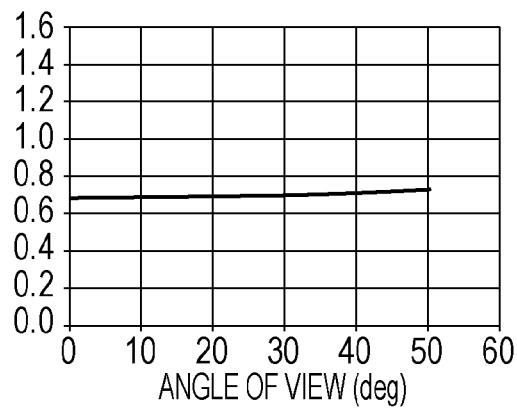
FIG. 6F illustrates the derivative of the angle $\alpha$ of inclination of an optical fiber in the imaging device according to the first exemplary embodiment.

FIG. 6E illustrates the magnitude of the angle α of inclination of an optical fiber in the imaging device according to the present exemplary embodiment. FIG. 6F illustrates the derivative of the angle α of inclination. As illustrated in FIGS. 6E and 6F, the angle α of inclination of the optical fiber increases substantially linearly along with an increase in the angle of view. A configuration for changing the derivative of the angle α of inclination will be described in a second exemplary embodiment.

Although a configuration in which the distance Pa1 is greater than the distance Pa2 is employed in the present exemplary embodiment, the distance Pb1 may be greater than the distance Pb2. Furthermore, the configuration may be such that the distance Pb increases as the distance from the optical axis AX increases. In addition, the configuration may be such that the distance Pa1 is greater than the distance Pa2 and the distance Pb1 is less than the distance Pb2.

Although the shape of the light-incident surface 3a of the optical fiber bundle 3 is spherical in the present exemplary embodiment, the shape is not limited thereto, and the shape of the light-incident surface 3a may be paraboloidal or aspherical. When the center of curvature of such a light-incident surface is to be calculated, the radius of curvature of a base spherical surface or a paraxial radius of curvature may be used.

In addition, the imaging optical system does not need to be the ball lens 2 that is point-symmetric. For example, the configuration may be such that the imaging optical system includes a stop, a pre-lens group disposed on a light-incident side of the stop, and a post-lens group disposed on a light-emission side of the stop. Furthermore, as the pre-lens group, an optical system in which the center of curvature of a lens surface having the highest power among the pre-lens group is located in the vicinity of the center of the stop may be used. In addition, as the post-lens group, an optical system in which the center of curvature of a lens surface having the highest power among the post-lens group is located in the vicinity of the center of the stop may be used. It is to be noted that the vicinity of the center of the stop refers to a range that is included within a sphere having a radius that is equal to the wavelength of the principal ray from the center of the stop. In addition, the pre-lens group and the post-lens group may each include a single lens or a plurality of lenses.

As described thus far, according to the imaging device of the present exemplary embodiment, an imaging device that reduces distortion generated in the imaging optical system 2 can be obtained. In addition, distortion can be corrected, and the decrease in the resolution (horizontal resolution) of an image obtained by the sensor 4 can be suppressed at the same time.

Second Exemplary Embodiment

The present exemplary embodiment differs from the first exemplary embodiment in the configuration of the optical fiber bundle 3. Specifically, in the first exemplary embodiment, the axes of the entire optical fibers 3c intersect with the optical axis AX at one point (PF). In the meantime, in the present exemplary embodiment, the point at which the axis VF of the optical fiber 3c intersects with the optical axis AX differs depending on the distance from the optical axis AX. The rest of the configuration is identical to that of the first exemplary embodiment, and the configuration of the imaging device is identical to the configuration in the schematic diagram illustrated in FIG. 1.

Figure 7:
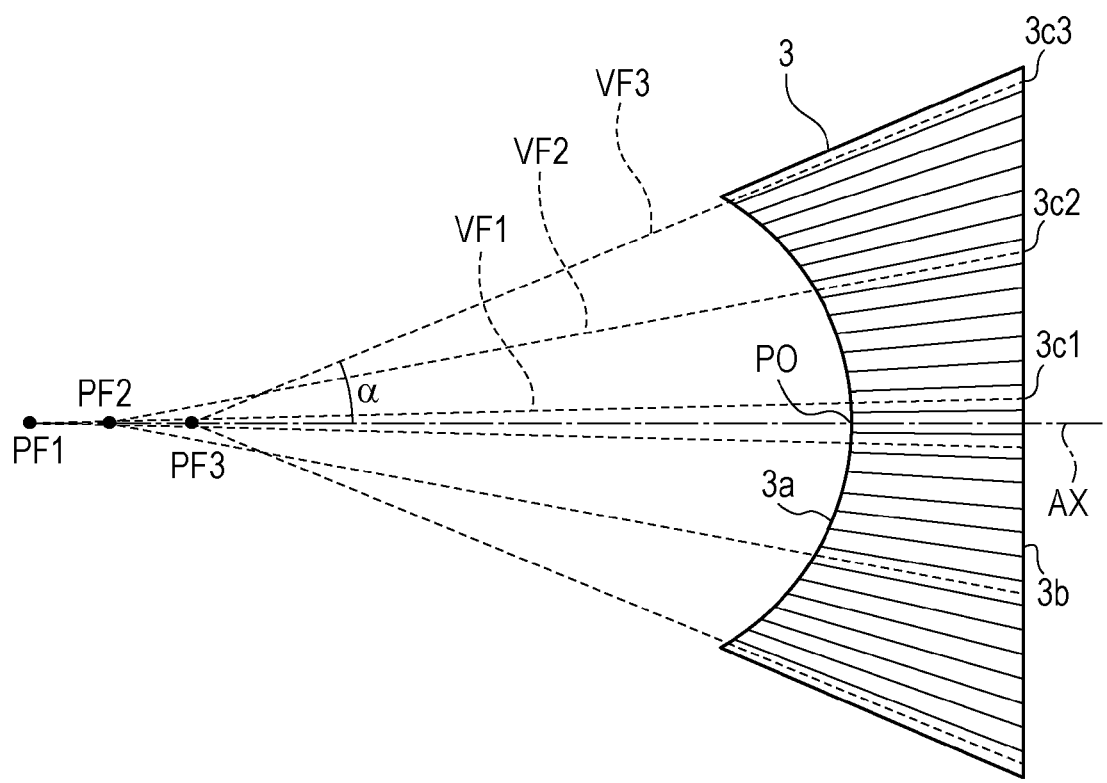
FIG. 7 is a schematic diagram illustrating an example of an optical fiber bundle in an imaging device according to a second exemplary embodiment.

As illustrated in FIG. 7, as an optical fiber 3c is farther from the optical axis AX, the position of the point of intersection of the axis VF of the optical fiber 3c and the optical axis AX is closer to the optical fiber bundle 3. To be more specific, three optical fibers 3c1, 3c2, and 3c3 will be considered. PF1 represents the point of intersection of the optical axis AX and the axis VF1 of the optical fiber 3c1, which is located closest to the optical axis AX among the three optical fibers 3c1, 3c2, and 3c3. In addition, PF2 represents the point of intersection of the optical axis AX and the axis VF2 of the optical fiber 3c2, which is located at an intermediate position among the three optical fibers 3c1, 3c2, and 3c3. Furthermore, PF3 represents the point of intersection of the optical axis AX and the axis VF3 of the optical fiber 3c3, which is located farthest from the optical axis AX among the three optical fibers 3c1, 3c2, and 3c3. In the present exemplary embodiment, PF1, PF2, and PF3 are located in this order from the side of an object. Through this configuration, in the optical fiber bundle 3 of the present exemplary embodiment, the value Rp and the value Rt can be set with ease in accordance with the distance from the optical axis AX.

In addition, the maximum angle of inclination in the optical fiber bundle 3 according to the present exemplary embodiment is the angle α of inclination of the axis of the optical fiber 3c3 located in the peripheral portion and is 35.0 (deg). This angle is the same as that in the first exemplary embodiment. Thus, the point of intersection PF3 of the axis VF3 of the optical fiber 3c3 and the optical axis AX is at the same position as the point of intersection PF of the axis VF of each optical fiber 3c and the optical axis AX in the first exemplary embodiment.

Figure 8A:
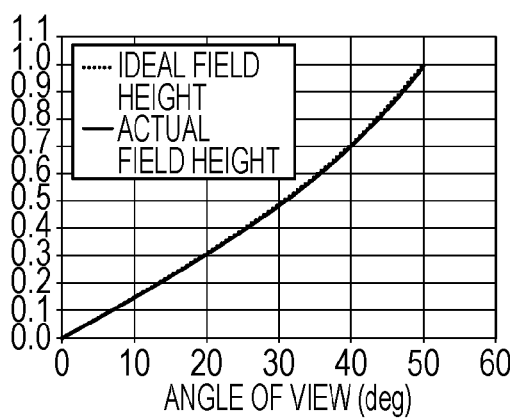
FIG. 8A illustrates the field height ratio in the imaging device according to the second exemplary embodiment.

FIG. 8A illustrates the ideal field height and the actual field height according to the present exemplary embodiment. The actual field height and the ideal field height at the respective angles of view are normalized by the maximum field height of the ideal field height. The ideal field height is expressed in the Y=f·tan ω property, in which the maximum angle of view of the imaging optical system is set to 50.0 (deg). Meanwhile, the actual field height represents the height of an actual image to be formed on the sensor 4 through the ball lens 2 and the optical fiber bundle 3. As illustrated in FIG. 8A, the actual field height that is substantially the same as the ideal field height is achieved according to the present exemplary embodiment.

Figure 8B:
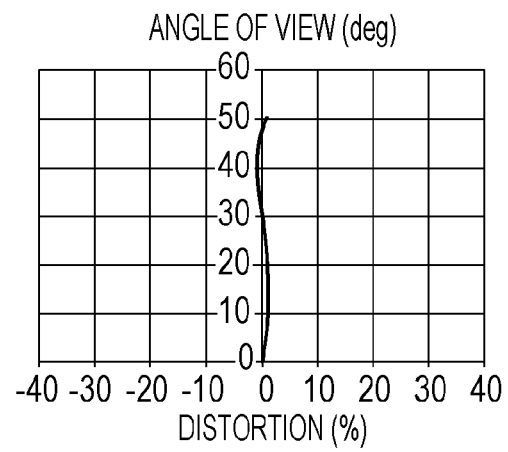
FIG. 8B illustrates distortion in the imaging device according to the second exemplary embodiment.

FIG. 8B illustrates distortion according to the present exemplary embodiment. The maximum distortion is +1.2(%), which is less than that in the first exemplary embodiment illustrated in FIG. 6B.

Figure 8C:
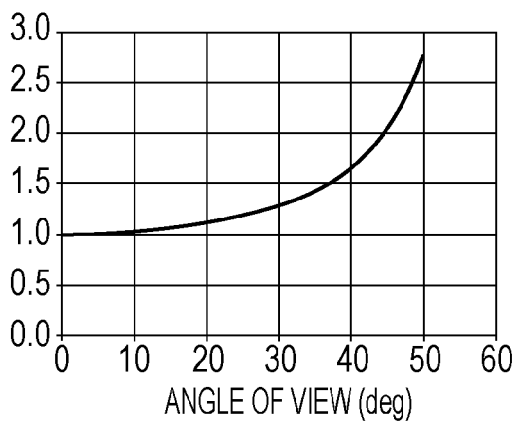
FIG. 8C illustrates the value Rp in the imaging device according to the second exemplary embodiment.

FIG. 8C illustrates the value Rp in the imaging device according to the present exemplary embodiment. Here, the value Rp is indicated such that the value Rp representing the ratio in a pair of optical fibers that is located in a center portion of the optical fiber bundle 3 and that includes an optical fiber extending along the optical axis AX and another optical fiber adjacent to the stated optical fiber is 1. The angle of view on the horizontal axis is mapped to the distance from the optical axis AX, and as the angle of view increases, the distance from the optical axis AX increases. In other words, as in the first exemplary embodiment, the configuration of the present exemplary embodiment is as follows. The value Rp in two optical fibers that are adjacent in the Y-direction and that are located farther from the optical axis AX is greater than the value Rp in two optical fibers that are adjacent in the Y-direction and that are located closer to the optical axis AX. Specifically, the value Rp in a pair of optical fibers that includes an optical fiber located farthest from the optical axis AX is greater than the value Rp in a pair of optical fibers that includes an optical fiber located on the optical axis AX or an optical fiber located closest to the optical axis AX. In addition, the value Rp increases as the distance from the optical axis AX increases.

In addition, in the present exemplary embodiment, the configuration is such that the value Rp increases further as the distance from the optical axis AX increases than in the optical fiber bundle 3 according to the first exemplary embodiment illustrated in FIG. 6C. Specifically, whereas the value Rp in the outermost portion is 1.56 in the first exemplary embodiment, the value Rp in the outermost portion is 2.76 in the present exemplary embodiment.

Figure 8D:
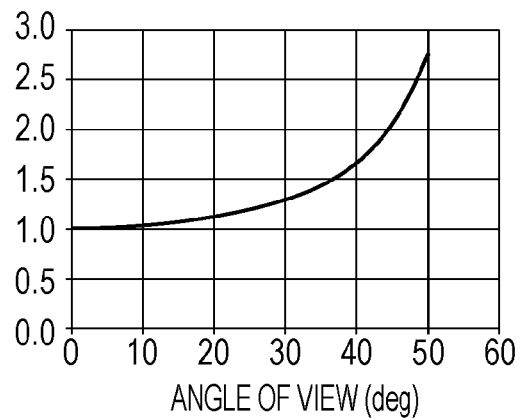
FIG. 8D illustrates the value Rt in the imaging device according to the second exemplary embodiment.

FIG. 8D illustrates the value Rt in the imaging device according to the present exemplary embodiment. Here, the value Rt is indicated such that the value Rt in the optical axis 3c located on the optical axis AX is 1. The angle of view on the horizontal axis is mapped to the distance from the optical axis AX, and as the angle of view increases, the distance from the optical axis AX increases. In other words, as in the first exemplary embodiment, the configuration of the present exemplary embodiment is as follows. The value Rt in an optical fiber located farther from the optical axis AX is greater than the value Rt in an optical fiber located closer to the optical axis AX. Specifically, the value Rt in an optical fiber located farthest from the optical axis AX is greater than the value Rt in an optical fiber located on the optical axis AX or an optical fiber located closest to the optical axis AX. In addition, the value Rt increases as the distance from the optical axis AX of the ball lens 2 increases.

In addition, in the present exemplary embodiment, the configuration is such that the value Rt increases further as the distance from the optical axis AX increases than in the optical fiber bundle 3 according to the first exemplary embodiment illustrated in FIG. 6D. Specifically, whereas the value Rt in the outermost portion is 1.56 in the first exemplary embodiment, the value Rt in the outermost portion is 2.76 in the present exemplary embodiment.

In this manner, as the value Rp and the value Rt in the optical fiber bundle 3 are changed in accordance with the distance from the optical axis AX, distortion occurring when an image is converted from the light-incident surface to the light-exit surface of the optical fiber bundle 3 can be corrected favorably.

In other words, according to the imaging device of the present exemplary embodiment, an imaging device that reduces distortion generated in the imaging optical system 2 can be obtained. In addition, distortion can be corrected, and the decrease in the resolution (horizontal resolution) of an image obtained by the sensor 4 can be suppressed at the same time.

Figure 8E:
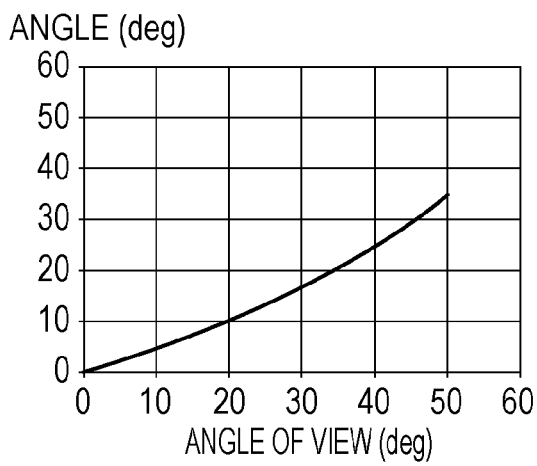
FIG. 8E illustrates the magnitude of the angle $\alpha$ of inclination of an optical fiber in the imaging device according to the second exemplary embodiment.
Figure 8F:
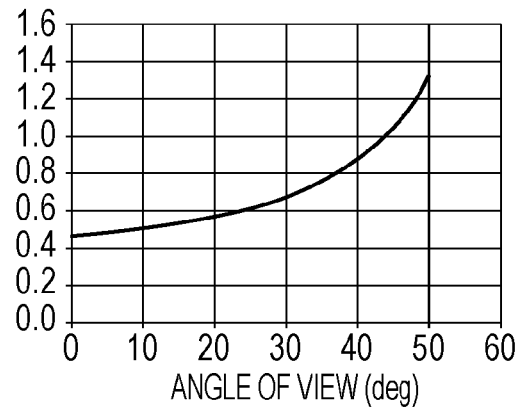
FIG. 8F illustrates the derivative of the angle $\alpha$ of inclination of an optical fiber in the imaging device according to the second exemplary embodiment.

In addition, as described above, in the imaging device according to the present exemplary embodiment, unlike the imaging device according to the first exemplary embodiment, the point of intersection of the axis VF of the optical fiber and the optical axis AX changes in accordance with the distance between the optical fiber and the optical axis AX, as illustrated in FIG. 7. Therefore, as compared with the first exemplary embodiment, distortion can be further corrected by adjusting the angle α of inclination of the optical fiber 3c. FIG. 8E illustrates the magnitude of the angle α of inclination of an optical fiber in the imaging device according to the present exemplary embodiment. As illustrated in FIG. 8E, the angle α of inclination of the optical fiber according to the present exemplary embodiment increases in a curve forming an arc protruding downwardly along with an increase in the angle of view. FIG. 8F illustrates the derivative of the angle α of inclination. FIG. 8F reveals that the derivative of the angle α of inclination increases along with an increase in the angle of incidence (angle of view) ω. In addition, the derivative of the angle α of inclination of an optical fiber located farthest from the optical axis AX is greater than the derivative of the angle α of inclination of an optical fiber located on the optical axis AX or an optical fiber located closest to the optical axis AX. That the derivative of the angle α of inclination increases in the peripheral portion of the optical fiber bundle 3 indicates that the enlarging effect of the image is greater in the peripheral portion, and the effect of reducing distortion further increases.

As described above, when the point of intersection of the optical fiber 3c and the optical axis AX is changed in accordance with the distance between the optical fiber 3c and the optical axis AX, the thickness of the optical fiber bundle 3 on the optical axis AX becomes important. As in the present exemplary embodiment, when the thickness of the optical fiber bundle 3 on the optical axis AX is set to be equal to or greater than the focal length of the imaging optical system, the effect of correcting distortion can be further exhibited.

Third Exemplary Embodiment

The present exemplary embodiment differs from the second exemplary embodiment in that the angle of view is increased and the configuration of the optical fiber bundle 3 is changed. Specifically, the maximum angle of view in an imaging device according to the present exemplary embodiment is 60.0 (deg), which is greater by 10.0 (deg) than the maximum angle of view of the imaging device according to the second exemplary embodiment. As the angle of view is increased, the amount of distortion increases accordingly. Therefore, the configuration of the optical fiber bundle 3 is changed from the configuration of the optical fiber bundle according to the second exemplary embodiment. Specifically, as illustrated in FIGS. 9C and 9D, the value Rp and the value Rt in the optical fiber bundle with respect to the angle of view differ from those in the optical fiber bundle according to the second exemplary embodiment. Specifically, it is not that the value Rp and the value Rt increase as the distance from the optical axis increases in all of the optical fibers in the optical fiber bundle, but there is a portion in which the value Rp and the value Rt decrease as the distance from the optical axis increases. In addition, in the optical fiber bundle 3 according to the present exemplary embodiment, the points of intersection of the optical fibers in a portion except for the outermost portion in which the imaging light is incident at the maximum angle of view are closer to the side of the object than in the second exemplary embodiment.

Figure 9A:
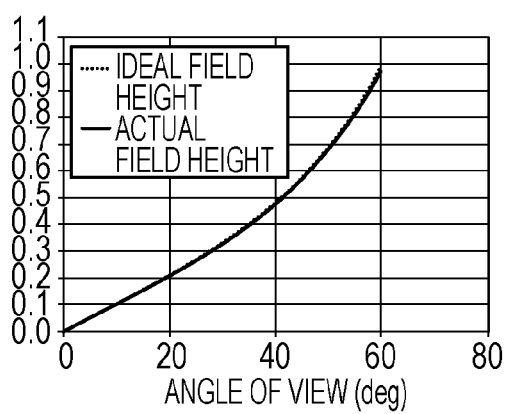
FIG. 9A illustrates the field height ratio in an imaging device according to a third exemplary embodiment.

FIG. 9A illustrates the ideal field height and the actual field height according to the present exemplary embodiment. The ideal field height and the actual field height at the respective angles of view are normalized by the maximum field height of the ideal field height. The ideal field height is expressed in the $Y = f \cdot \tan \omega$ property, in which the maximum angle of view of the imaging optical system is set to 60.0 (deg). Meanwhile, the actual field height is the height of an actual image to be formed on the sensor 4 through the ball lens 2 and the optical fiber bundle 3. As illustrated in FIG. 9A, the actual field height that is substantially the same as the ideal field height is achieved according to the present exemplary embodiment.

Figure 9B:
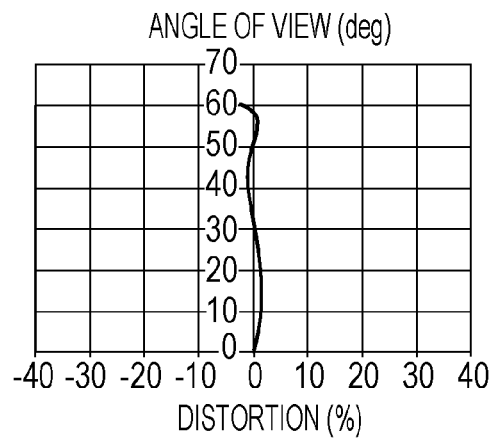
FIG. 9B illustrates distortion in the imaging device according to the third exemplary embodiment.
Figure 9C:
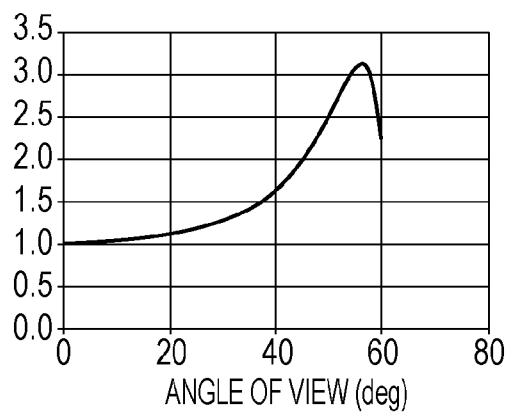
FIG. 9C illustrates the value Rp in the imaging device according to the third exemplary embodiment.
Figure 9D:
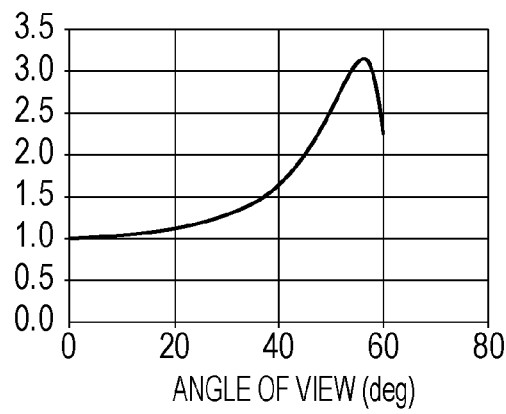
FIG. 9D illustrates the value Rt in the imaging device according to the third exemplary embodiment.

FIG. 9B illustrates distortion according to the present exemplary embodiment. The maximum distortion is −2.1(%), and the distortion is corrected to very small distortion while the angle of view is large.

FIG. 9C illustrates the value Rp in the imaging device according to the present exemplary embodiment. Here, the value Rp is indicated such that the value Rp representing the ratio in a pair of optical fibers that is located in a center portion of the optical fiber bundle 3 and that includes an optical fiber extending along the optical axis AX and another optical fiber adjacent to the stated optical fiber is 1. The angle of view on the horizontal axis is mapped to the distance from the optical axis AX, and as the angle of view increases, the distance from the optical axis AX increases. In other words, as in the first exemplary embodiment, the configuration of the present exemplary embodiment is as follows. The value Rp in two optical fibers that are adjacent in the Y-direction and that are located closer to the optical axis AX is less than the value Rp in two optical fibers that are adjacent in the Y-direction and that are located farther from the optical axis AX. Specifically, the value Rp in a pair of optical fibers that includes an optical fiber located farthest from the optical axis AX is greater than the value Rp in a pair of optical fibers that includes an optical fiber located on the optical axis AX or an optical fiber located closest to the optical axis AX.

In addition, whereas the maximum value Rp is 2.76 in the second exemplary embodiment, the maximum value Rp is 3.13 in the present exemplary embodiment. The optical fiber set in the maximum value Rp is at a position at which the angle of view is 56.1 (deg) and the field height ratio is 0.88, which is not in the outermost portion where the angle of view is 60.0 (deg) and the field height ratio is 1.00. The value Rp in the outermost portion is 2.25, which is greater than the value Rp on the optical axis AX.

This configuration is employed in order to appropriately reduce distortion when the angle of view is set to 60.0 (deg).

FIG. 9D illustrates the value Rt in the imaging device according to the present exemplary embodiment. Here, the value Rt is indicated such that the value Rt in the optical fiber 3c located on the optical axis AX is 1. The angle of view on the horizontal axis is mapped to the distance from the optical axis AX, and as the angle of view increases, the distance from the optical axis AX increases. In other words, as in the first exemplary embodiment, the configuration of the present exemplary embodiment is as follows. The value Rt in an optical fiber located closer to the optical axis AX is less than the value Rt in an optical fiber located farther from the optical axis AX. Specifically, the value Rt in an optical fiber located farthest from the optical axis AX is greater than the value Rt in an optical fiber located on the optical axis AX or an optical fiber located closest to the optical axis AX.

What is applicable to the value Rp also applies to the value Rt. In other words, it is not that the value Rt is maximized in the outermost portion, but the value Rt is maximized at a position where the angle of view is smaller than that in the outermost portion. Specifically, the optical fiber 3c set in the maximum value Rt is at a position at which the angle of view is 56.1 (deg) and the field height ratio is 0.88. The value Rt at the angle of view of 60.0 (deg) is 2.25, which is greater than the value Rt on the optical axis AX.

This configuration is employed in order to appropriately reduce distortion when the angle of view is set to 60.0 (deg).

Figure 9E:
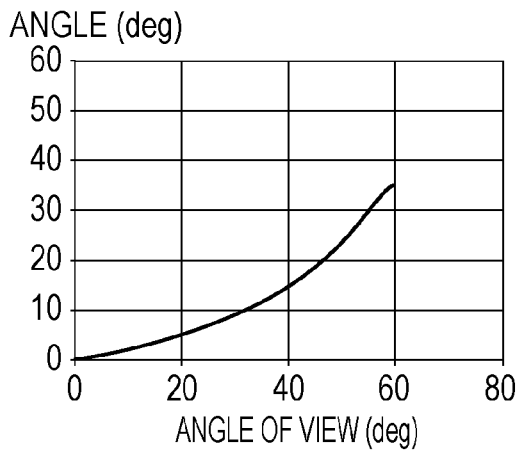
FIG. 9E illustrates the magnitude of the angle $\alpha$ of inclination of an optical fiber in the imaging device according to the third exemplary embodiment.
Figure 9F:
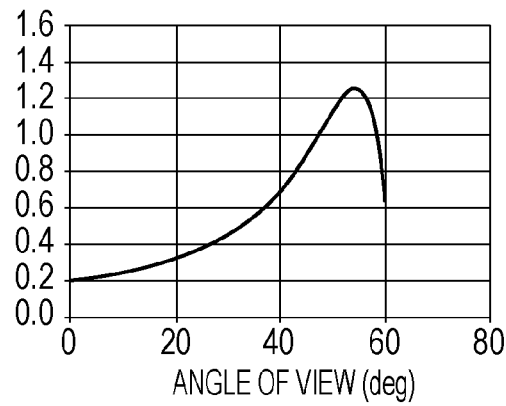
FIG. 9F illustrates the derivative of the angle $\alpha$ of inclination of an optical fiber in the imaging device according to the third exemplary embodiment.

In addition, as described above, in the imaging device according to the present exemplary embodiment, as in the imaging device according to the second exemplary embodiment, the point of intersection of the axis VF of the optical fiber and the optical axis changes in accordance with the distance between the optical fiber and the optical axis, as illustrated in FIG. 7. FIG. 9E illustrates the magnitude of the angle α of inclination of an optical fiber in the imaging device according to the present exemplary embodiment. As illustrated in FIG. 9E, the angle α of inclination of the optical fiber according to the present exemplary embodiment increases in a curve forming an arc protruding downwardly along with an increase in the angle of incidence (angle of view) ω. FIG. 9F illustrates the derivative of the angle α of inclination. In addition, the derivative of the angle α of inclination of an optical fiber located farthest from the optical axis AX is greater than the derivative of the angle α of inclination of an optical fiber located on the optical axis AX or an optical fiber located closest to the optical axis AX. That the derivative of the angle α of inclination increases in the peripheral portion of the optical fiber bundle 3 indicates that the enlarging effect of the image is greater in the peripheral portion, and the effect of reducing distortion increases.

As described thus far, according to the imaging device of the present exemplary embodiment, an imaging device that reduces distortion generated in the imaging optical system 2 can be obtained. In addition, distortion can be corrected, and the decrease in the resolution (horizontal resolution) of an image obtained by the sensor 4 can be suppressed at the same time.

The imaging devices described above can be used in a digital camera, a digital video camera, a camera for a mobile phone, a surveillance camera, a fiberscope, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125725, filed Jun. 18, 2014, which is hereby incorporated by reference herein in its entirety.

What is claimed is:

1. An imaging device, comprising:
  an imaging optical system;
  an image sensor; and
  an optical fiber bundle including a plurality of optical fibers configured to guide light from the imaging optical system to the image sensor,
  wherein the optical fiber bundle includes a first pair of optical fibers including two optical fibers that are adjacent in a meridional direction and a second pair of optical fibers including two optical fibers that are adjacent in the meridional direction,
  wherein, in each of the first pair of optical fibers and the second pair of optical fibers, a first value, which is a value representing a ratio of a component of a distance in the meridional direction between centers of the optical fibers along a light-exit surface to a component of a distance in the meridional direction between centers of the optical fibers along a light-incident surface, is greater than one, and
  wherein the first value in the second pair of optical fibers, which is located farther from an optical axis of the imaging optical system, is greater than the first value in the first pair of optical fibers, which is located closer to the optical axis of the imaging optical system.

2. The imaging device according to claim 1, wherein the first pair of optical fibers includes one of an optical fiber located on the optical axis of the imaging optical system and an optical fiber located closest to the optical axis of the imaging optical system, and
  wherein the second pair of optical fibers includes an optical fiber located farthest from the optical axis of the imaging optical system.

3. The imaging device according to claim 1, wherein, in each of the first pair of optical fibers and the second pair of optical fibers, when a second value is a value representing a ratio of the distance between the centers of the optical fibers along the light-exit surface to the distance between the centers of the optical fibers along the light-incident surface, the second value in the first pair of optical fibers is different from the second value in the second pair of optical fibers.

4. The imaging device according to claim 3, wherein the second value in the second pair of optical fibers is greater than the second value in the first pair of optical fibers.

5. The imaging device according to claim 3, wherein the second value is greater than one.

6. The imaging device according to claim 1, wherein the distance between the centers of the first pair of optical fibers along the light-incident surface is different from the distance between the centers of the second pair of optical fibers along the light-incident surface.

7. The imaging device according to claim 6, wherein the distance between the centers of the second pair of optical fibers along the light-incident surface is less than the distance between the centers of the first pair of optical fibers along the light-incident surface.

8. The imaging device according to claim 1, wherein the distance between the centers of the first pair of optical fibers along the light-exit surface is different from the distance between the centers of the second pair of optical fibers along the light-exit surface.

9. The imaging device according to claim 8, wherein the distance between the centers of the second pair of optical fibers along the light-exit surface is greater than the distance between the centers of the first pair of optical fibers along the light-exit surface.

10. The imaging device according to claim 1,
wherein the plurality of optical fibers include core portions and clad portions, and
wherein, when a third value is a value representing a ratio of a diameter of the core portion in one optical fiber along the light-exit surface to a diameter of the core portion of the optical fiber along the light-incident surface, the third value in a first optical fiber located closer to the optical axis of the imaging optical system is different from the third value in a second optical fiber located farther from the optical axis of the imaging optical system.

11. The imaging device according to claim 10,
wherein the first optical fiber is one of an optical fiber located on the optical axis of the imaging optical system and an optical fiber located closest to the optical axis of the imaging optical system, and
wherein the second optical fiber is an optical fiber located farthest from the optical axis of the imaging optical system.

12. The imaging device according to claim 10, wherein the third value in the second optical fiber is greater than the third value in the first optical fiber.

13. The imaging device according to claim 10, wherein the third value is greater than one.

14. The imaging device according to claim 1, wherein a derivative of an angle of inclination of an axis of the optical fiber with respect to an angle of view differs in a third optical fiber located closer to the optical axis of the imaging optical system and a fourth optical fiber located farther from the optical axis of the imaging optical system.

15. The imaging device according to claim 14,
wherein the third optical fiber is one of an optical fiber located on the optical axis of the imaging optical system and an optical fiber located closest to the optical axis of the imaging optical system, and
wherein the fourth optical fiber is an optical fiber located farthest from the optical axis of the imaging optical system.

16. The imaging device according to claim 14, wherein the derivative of the angle of inclination of the axis of the fourth optical fiber with respect to the angle of view is greater than the derivative of the angle of inclination of the axis of the third optical fiber with respect to the angle of view.

17. The imaging device according to claim 14, wherein the derivative of the angle of inclination of the axis of the optical fiber with respect to the angle of view increases as the distance from the optical axis of the imaging optical system increases.

18. The imaging device according to claim 1, wherein the light-incident surface of the optical fiber bundle is recessed away from the imaging optical system.

19. The imaging device according to claim 1,
wherein the imaging optical system includes a stop, a pre-lens group disposed on a light-incident side of the stop, and a post-lens group disposed on a light-emission side of the stop, and
wherein a center of curvature of a lens surface having a highest power among the pre-lens group is located in the vicinity of a center of the stop.

20. The imaging device according to claim 19, wherein a center of curvature of a lens surface having a highest power among the post-lens group is located in the vicinity of the center of the stop.

21. The imaging device according to claim 1, wherein the imaging optical system is point-symmetric.

22. An imaging device, comprising:
an imaging optical system;
an image sensor; and
an image transfer unit including a plurality of optical waveguide members configured to guide light from the imaging optical system to the image sensor,
wherein the image transfer unit includes a first pair of optical waveguide members including two optical waveguide members that are adjacent in a meridional direction and a second pair of optical waveguide members including two optical waveguide members that are adjacent in the meridional direction,
wherein, in each of the first pair of optical waveguide members and the second pair of optical waveguide members, a first value, which is a value representing a ratio of a component of a distance in the meridional direction between centers of the optical waveguide members along a light-exit surface to a component of a distance in the meridional direction between centers of the optical waveguide members along a light-incident surface, is greater than one, and
wherein the first value in the second pair of optical waveguide members, which is located farther from an optical axis of the imaging optical system, is greater than the first value in the first pair of optical waveguide members, which is located closer to the optical axis of the imaging optical system.

* * * * *